Feb. 13, 1923.
H. G. RALPH.
DENTAL FILM HOLDER.
FILED FEB. 14, 1921.
1,445,169.
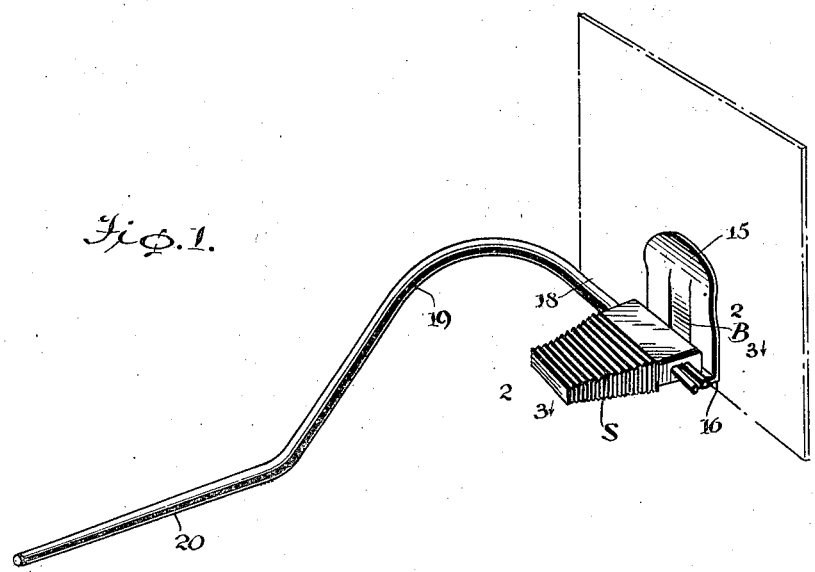
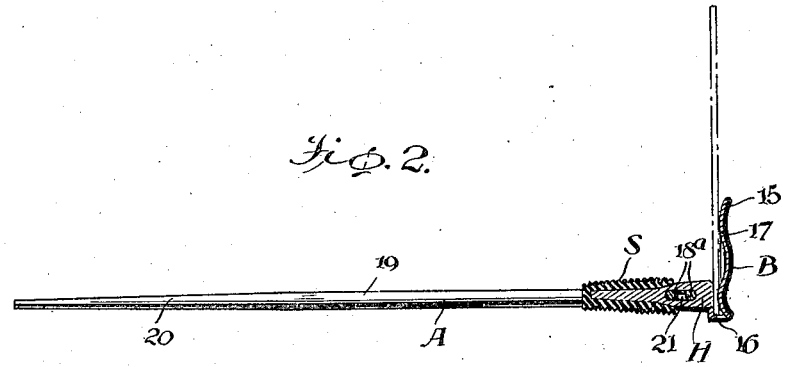
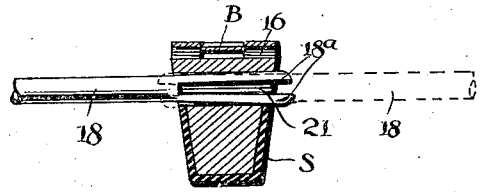
WITNESSES
INVENTOR
Henry G. Ralph,
BY
ATTORNEYS Patented Feb. 13, 1923.

1,445,169

UNITED STATES PATENT OFFICE.

HENRY GRADY RALPH, OF EDENTON, NORTH CAROLINA.

DENTAL FILM HOLDER.

Application filed February 14, 1921. Serial No. 444,848.

*To all whom it may concern:*

Be it known that I, HENRY GRADY RALPH, a citizen of the United States, and a resident of Edenton, in the county of Chowan and State of North Carolina, have invented certain new and useful Improvements in Dental Film Holders, of which the following is a specification.

My invention relates to devices for holding X-ray films in the mouth of dental patients. In dental film holders as heretofore proposed, great difficulty has been entertained by dentists in determining the exact position of the film in the patients' mouths after it has been inserted in order that the strongest part of the rays may be projected on that portion of the film to be intercepted by the tooth to be photographed so as to produce a clear and well defined picture. This difficulty occurs particularly when photographing posterior portions of the mouth, and is due mainly to the fact that the film holders are so constructed that they are completely hidden when the mouth of the patient is closed so that there is nothing visible upon which the dentist can rely to guide him when directing the rays upon the film.

It is a purpose of my invention to overcome these difficulties by providing a film holder which when positioned in the mouth and the latter closed has a portion thereof that is visible to accurately guide the dentist in projecting the strongest rays directly upon the tooth or other portion of the mouth to be photographed, and to thus insure the projection of a clear and well defined photograph in which the object is advantageously positioned upon the film.

I will describe one form of film holder embodying my invention and will then point out the novel features thereof in claims.

In the accompanying drawings:

Figure 1 is a view showing in perspective one form of film holder embodying my invention with the film shown in dash lines and in proper position within the holder.

Figure 2 is a side elevation of the device, parts being shown in section.

Figure 3 is an enlarged fragmentary detail view of the head and adjacent portion of the supporting arm of the holder shown in the preceding views, with the head in section taken on the line 3—3 of Figure 2.

Referring specifically to the drawings, in which similar reference characters refer to similar parts, my invention in its present embodiment consists in the main of a head H having integrally formed therewith a bracket B and a supporting and guiding arm A which is detachably associated with the head.

The head H is of wedge shaped form and is preferably covered with a corrugated rubber sleeve S to permit of the secure gripping of the head between the teeth. The thick end of the head carries the bracket B which latter includes a main vertical section 15 and a bottom section 16 which maintains the main section in spaced relation from the adjacent end of the head H to provide a channel therebetween for the reception of the film. The section 15 is split longitudinally at two points to provide a retention tongue 17 which as shown in Figure 2 is bent longitudinally so that its lower free end is disposed within the channel between the head and bracket so that when the film is inserted therein the tongue is flexed outwardly and thus clampingly secures the film in vertical position upon the holder. The area of the main section 15 is such as to brace the film against lateral movement and to thus insure its occupying a perpendicular position upon the head.

The supporting and guiding arm A consists of a single length of relatively heavy wire which is bent to provide a linear attaching portion 18, a curved portion 19 and a pointer or guiding linear portion 20, which, by virtue of the curved portion 19 is disposed at right angles to the attaching portion 18. The attaching portion 18 is bifurcated at its free end to form gripping jaws 18ª which are adapted to be inserted within a socket 21 formed in the thick end of the head H. The construction of the jaws 18ª is such that when disposed within the socket 21 they are slightly contracted so as to frictionally retain the head H upon the arm A. In order to prevent turning of the head with respect to the arm, the sides of the jaws 18ª are flattened and the socket 21 is of substantially ovate contour in cross section.

In practice, the film holder is inserted into the mouth of the patient in such manner that the head H can be readily gripped between the teeth and in such position that the film will be supported in vertical position at the inner side of the teeth. With the head and bracket so positioned, the curved portion 19 of the supporting arm A will project from the side of the mouth so that the guiding or pointer portion 20 extends laterally from the cheek. By reference to Figure 1, it will be noted that the guiding portion 20 coincides with the longitudinal axis of the head H so that with the film properly positioned within the bracket B the portion 20 will coincide with the medial portion of the film. Thus, when the holder is positioned within the mouth as described, the guiding portion 20 located exteriorly of the mouth will point directly to the center of the film and thus guide the dentist in projecting the rays upon the film.

It is to be particularly noted that because of the construction of the socket 21 and the jaws 18$^a$, the head H together with the bracket B can be readily removed from the supporting arm A and applied in other positions on the portion 18 so that the bracket B will support the film in an inverted position to that shown in Figure 1 or in upright and inverted positions at the inner side of the portion 18. By virtue of this adjustability it is possible to support the film at the inner side of the upper jaw teeth on the lower jaw teeth and at opposite sides of the jaws, it being understood that when the film is held in upright and inverted positions at the left side of either jaw, the guiding portion 20 projects from the left side of the face, and conversely when the film is supported in upright and inverted positions at the right side of the jaw, the portion 20 projects from the right side of the face. In other words the adjustability of the head and bracket with respect to the supporting arm permits of the supporting of the film at any desired point within the mouth, with the guiding portion 20 indicating at all times the exact position of the film when the mouth is closed.

It will be observed that the indicating member which is generally designated by the reference character "A" is detachably connected to the head so that the same may be reversed in its connection with the head. This permits the device as illustrated to be used on either side of the mouth and in connection with the upper or lower teeth by a very slight adjustment. More specifically when it is desired to change the position of the parts the indicating rod "A" is slipped out of the opening 21 and is reinserted into the opposite side thereby permitting the device to be used in a variety of positions.

Although I have herein shown and described only one form of film holder embodying my invention, it is to be understood that various changes and modifications may be made herein without departing from the spirit of the invention and the spirit and scope of the appended claims.

What I claim is:

1. A dental film holder for posterior and anterior work comprising a head having means whereby to support a film within one's mouth and having an opening extending out through opposite sides thereof, and an indicating rod having an attaching portion detachably received in said opening, that portion of the rod remote from the head being pointed directly to the film carried by the head whereby to guide the operator in positioning the tube of the X ray machine and the portion of the rod adjacent the head being curved longitudinally for the reception of the cheek.

2. A dental film holder for posterior and anterior work comprising a head having means whereby to support a film within one's mouth, and an indicating rod connected to the head, that portion of the indicating rod adjacent the head being curved longitudinally to define a recess adapted for the reception of one's cheek, that portion of the rod remote from the head being straight and pointed directly to the film whereby to indicate the position of the film carried by the head.

3. A dental film holder comprising a head having a film supporting means, and a handle having one end portion spaced from said head and pointing directly to it, whereby to indicate the position of the head and the film carried thereby, the other end portion of said handle being bowed and extending into one side of said head.

4. A dental film holder comprising a head having a film supporting means, a handle having one end portion spaced from said head and pointing directly to it, whereby to indicate the position of the head and the film carried thereby, the other end portion of said handle being bowed and extending into one side of said head, and a gripping member connected to said head.

5. A dental film holder comprising, a head having a socket formed therein, a gripping sleeve embracing the head, a bracket secured to the head and having a tongue which coacts with the head to frictionally retain a film within the bracket, and a supporting arm having a bifurcated end portion to provide resilient jaws which are insertable within said socket.

6. A dental film holder comprising, a head having a socket formed therein, a gripping sleeve embracing the head, a bracket secured to the head and having a tongue which coacts with the head to frictionally retain a film within the bracket, a supporting arm having a bifurcated end portion to provide resilient jaws which are insertable within said socket, and a guiding portion, the longitudinal axis of which is adapted to intersect the bracket, for the purpose described.

HENRY GRADY RALPH.